(12) United States Patent
Bent et al.

(10) Patent No.: US 10,162,836 B1
(45) Date of Patent: Dec. 25, 2018

(54) PARALLEL FILE SYSTEM WITH STRIPED METADATA

(71) Applicant: EMC IP Holding Company LLC, Hopkinton, MA (US)

(72) Inventors: John M. Bent, Los Alamos, NM (US); Sorin Faibish, Newton, MA (US); James M. Pedone, West Boylston, MA (US); Percy Tzelnic, Concord, MA (US); Uday Gupta, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 310 days.

(21) Appl. No.: 14/319,639

(22) Filed: Jun. 30, 2014

(51) Int. Cl.
  *G06F 17/30* (2006.01)
(52) U.S. Cl.
  CPC .. *G06F 17/30224* (2013.01); *G06F 17/30091* (2013.01); *G06F 17/30165* (2013.01); *G06F 17/30185* (2013.01); *G06F 17/30194* (2013.01); *G06F 17/30203* (2013.01); *G06F 17/30233* (2013.01)
(58) Field of Classification Search
  CPC ......... G06F 17/30224; G06F 17/30091; G06F 17/30104; G06F 17/30233; G06F 17/30165; G06F 17/30185; G06F 17/30194; G06F 17/30203
  USPC ................. 707/827, 826, 821, 823
  See application file for complete search history.

(56) References Cited

U.S. PATENT DOCUMENTS

| | | | | |
|---|---|---|---|---|
| 8,176,246 | B1* | 5/2012 | Jernigan, IV | H04L 67/2804 711/113 |
| 8,898,206 | B1* | 11/2014 | Jiang | G06F 17/3012 707/797 |
| 2003/0204670 | A1* | 10/2003 | Holt | G06F 3/0601 711/112 |
| 2004/0024963 | A1* | 2/2004 | Talagala | G06F 11/1076 711/114 |

(Continued)

OTHER PUBLICATIONS

Bent et al, "PLFS: A Checkpoint Filesystem for Parallel Applications", SC09 Portland, OR, Nov. 14-20, 2009, pp. 1-12.*

(Continued)

*Primary Examiner* — Alex Gofman
*Assistant Examiner* — Kamal K Dewan
(74) *Attorney, Agent, or Firm* — Ryan, Mason & Lewis, LLP

(57) ABSTRACT

Metadata associated with a plurality of sub-files associated with a single shared file is stored in a parallel file system. A plurality of processes generate a shared file. A compute node implements a Parallel Log Structured File System (PLFS) library to store at least one portion of the shared file and metadata for the at least one portion of the shared file on one or more of the plurality of object storage servers. The compute node is further configured to store the metadata by striping the metadata across a plurality of subdirectories of the shared file. The metadata is optionally striped across the plurality of subdirectories in a round-robin manner. The plurality of subdirectories are stored on one or more of the object storage servers. Write and read processes optionally communicate using a message passing interface. A given (Continued)

write process optionally writes metadata for a given portion of the shared file to an index file in a particular one of the subdirectories corresponding to the given portion.

20 Claims, 10 Drawing Sheets

(56) References Cited

U.S. PATENT DOCUMENTS

| | | | | |
|---|---|---|---|---|
| 2006/0101025 A1* | 5/2006 | Tichy | ............... | G06F 17/30067 |
| 2007/0156763 A1* | 7/2007 | Liu | ................... | G06F 17/30067 |
| 2010/0235413 A1* | 9/2010 | Patel | .................. | G06F 11/1076 |
| | | | | 707/825 |
| 2011/0016353 A1* | 1/2011 | Mikesell | ............. | G06F 11/1435 |
| | | | | 714/15 |
| 2011/0040810 A1* | 2/2011 | Kaplan | ............... | G06F 17/3007 |
| | | | | 707/822 |
| 2012/0096237 A1* | 4/2012 | Punkunus | ............. | G06F 3/0613 |
| | | | | 711/209 |
| 2013/0159364 A1* | 6/2013 | Grider | ............... | G06F 17/30224 |
| | | | | 707/826 |
| 2013/0179481 A1* | 7/2013 | Halevy | ............. | G06F 17/30224 |
| | | | | 707/827 |
| 2014/0108707 A1* | 4/2014 | Nowoczynski | ..... | G06F 12/0246 |
| | | | | 711/103 |
| 2014/0108723 A1* | 4/2014 | Nowoczynski | ..... | G06F 12/0866 |
| | | | | 711/113 |
| 2015/0277802 A1* | 10/2015 | Oikarinen | ............ | G06F 3/0631 |
| | | | | 711/114 |

OTHER PUBLICATIONS

Brett et al, "Lustre and PLFS Parallel I/O Performance on a Cray XE6", Cray User Group Lugano, Switzerland, May 4-8, 2014, pp. 1-33.*

Cranor et al., "Structuring PLFS for Extensibility", PDSW13, pp. 20-26, Denver, CO, Nov. 18, 2013.

* cited by examiner

```
int plfs_write(char *file, off_t off, len_t len, char *buffer) {
    // first, if the write spans multiple stripes, then split it here into multiple writes
    // which do not span stripes and then recursively call this function for each. That
    // would then do one write to a different index log for each and one write for each to
    // the same data log. A trickier thing that would only do one write to the data log
    // would be to just do the write of the entire incoming buffer to the data log (like
    // normal) and then do the split for just the index entries to the striped index logs
    // That trickier code is basically the same as WriteFile::writex here:
    // https://github.com/zhang-jingwang/in branch iod // now the rest of this code assumes the write doesn't span a stripe
    datalog.append(buffer,off,len); // just like normal, write to the local data log
    int which_stripe = floor(off/config->stripe_size);
    if (this->stripe_dirs_created[which_stripe] == FALSE
    then plfs_mksubdir("stripe.%d", which_stripe);
    // now the only difference relative to current PLFS is that instead of just a
    // single index log per file, there is one per stripe
    indexlog = get_indexlog(which_stripe);
    indexlog.addWrite(...); // just like normal
}
```
⎯ 600

FIG. 7

```
plts_open_read(char *file) {

// perform conventional plfs operations such as ensuring file exists
    // with appropriate permissions // read in data logs which contain plfs metadata that plfs stored when the file was written
    plfs_init();
    plfs_read();
}
```

```
int plfs_read(char *file, off_t off, len_t len, char *buffer) {
/// first, if the read spans multiple stripes, then split into multiple reads that
/// don't span stripes. This is optionally done before the actual read
/// in the existing PLFSIndex.cpp:find_read_tasks function
/// which do not span stripes and then recursively call this function for each. That
/// would then do one write to a different index log for each and one write for each to
/// the same data log. A trickier thing that would only do one write to the data log
/// would be to just do the write of the entire incoming buffer to the data log (like
/// normal) and then do the split for just the index entries to the striped index logs
/// That trickier code is basically the same as WriteFile::writex here:
/// https://github.com/zhang-jingwang/ in branch iod int which_stripe = floor(off/config->stripe_size);
plfs_index = stripe_indices->get_index(which_stripe);
// now do the read like normal
}

Class Stripe_Indices {
    map<int,plfs_index> indices;
    get_index(int which_stripe) {
        if ! indices[which_stripe]
            if this->total_memory > config->stripe_size
                then this->evict_oldest(); // does LRU to evict a stripe index
            // now that we've freed space, fetch, cache, and return the index for this stripe
            indices[which_stripe] = make_global_index(stripe_subdir(which_stripe));
        return indices[which_stripe];
    }
};
```

```
int adio_plfs_file_open(char *file, MPI_Communicator mcom) {
    // spawn an MPI listener thread listening on MPI_RECEIVE_ANY (call it an index server)
    // now fetch any old index data so that no stale entries are saved
    map<int,plfs_index> indices
    foreach stripedir in readdir(container)
        if stripedir.id % myrank == 0
            // this is my stripe so read the old index there
            indices[stripedir.id] = make_global_index(stripedir)

// this is a bit different. Current PLFS just appends to both index and data log and
    // the order of the additions to each log is consistent (i.e. the Nth append to the
    // index log corresponds to the Nth append to the data log). But now that we have
    // striped index logs and local data logs, the correspondence is lost so we need to
    // remember the current EOF of our data log
    off_t data_log_eof = 0;
} int adio_plfs_file_close() {
    // we buffered our stripe index so let's flush it now at close
    foreach stripeid in indices.keys
        index = indices[stripeid]
        indexlog = get_indexlog(stripeid);
        indexlog.overwrite(index)
        // optimization: first write to new log, then unlink old temporary inconsistency
}
```

*FIG. 10*

```
int adio_plfs_file_write(off_t offset, len_t length, char *buffer) {
  // just like in POSIX write, split if it spans multiple stripes // make and send a message about the write to the appropriate index server
  int which_stripe = floor(off/config->stripe_size);
  int which_server = which_stripe % num_ranks
  msg = make_index_message(myrank, data_log_eof, offset, length)
  MPI_Send(which_server, msg);

// now do the data log write like normal and increment our current eof count
  datalog.append(buffer, length);
  data_log_eof += length;
}

// here is the function that receives the above message in the index server
int adio_plfs_receive_index_addition(char *msg) {
  (who, physical_off, logical_off, length) = decode_msg(msg);
  int which_stripe = floor(off/config->stripe_size);
  assert(is defined indices[which_stripe]) // this better be our stripe
  indices.add_write(who, physical_off, logical_off, length);

```
int adio_plfs_file_read(off_t offset, len_t length, char *buffer) {
  // just like in POSIX read, split if it spans multiple stripes // make and send a message about the read to the appropriate index server
  int which_stripe = floor(off/config->stripe_size);
  int which_server = which_stripe % num_ranks
  msg = make_index_query(myrank, data_log_eof, offset, length)
  MPI_Send(which_server, msg);

// now wait for that server to send us back the requested info
  // note that even though the index info was on one logical stripe, the physical data
  // might be spread across multiple data logs
  MPI_Receive(which_server, msg)
  set<(where, physical_off, length)> reads = decode_msg(msg)
  size_t buffer_offset = 0;
  foreach read in reads {
    datalog = get_datalog(read.where);
    datalog.read(&(buffer[buffer_offset]), read.physical_off, read.length);
    buffer_offset += read.length
  }
}

// here is the function in the index server that receives the above query
int adio_plfs_receive_index_query(char *msg) {
  (who, logical_off, length) = decode_msg(msg);
  // use the existing find_read_tasks code
  set<(where,physical_off,length)> reads = find_read_tasks;
  reply = make_message(reads)
  MPI_Send(who, reply)
}
```

PARALLEL FILE SYSTEM WITH STRIPED METADATA

FIELD

The field relates generally to data storage and more particularly to parallel file systems and other types of cluster file systems.

BACKGROUND

Parallel storage systems are widely used in many computing environments. Parallel storage systems provide high degrees of concurrency in which many distributed processes within a parallel application simultaneously access a shared file namespace. Parallel computing techniques are used in many industries and applications for implementing computationally intensive models or simulations.

In many parallel computing applications, a group of distributed processes must often write data to a shared file. When multiple processes attempt to write data to a shared file concurrently, however, the performance of the parallel storage system will be impaired. Serialization can cause significant performance degradation as the parallel processes must remain idle while they wait for one another. Serialization is incurred when the parallel file system locks a shared file in order to maintain the consistency of the shared file.

Parallel Log Structured File System (PLFS) is a virtual log-structured file system that allows data to be written quickly into parallel file systems. PLFS is particularly useful when multiple applications write concurrently to a shared file in a parallel file system. Generally, PLFS improves write performance in this context by rearranging the IO operations from being write operations to a single file to being write operations to a set of sub-files. Metadata is created for each sub-file to indicate where the data is stored. The metadata is resolved when the shared file is read. One challenge, however, is that the amount of metadata required to be read data back can be extremely large. Each reading process must read all of the metadata that was created by all of the writing processes. Thus, all of the reading processes are required to redundantly store the same large amount of metadata in a memory cache.

A need therefore exists for improved techniques for storing metadata associated with sub-files from a single shared file in a parallel file system.

SUMMARY

Embodiments of the present invention provide improved techniques for storing metadata associated with a plurality of sub-files associated with a single shared file in a parallel file system. In one embodiment, a compute node of a parallel file system is configured to communicate with a plurality of object storage servers and with a plurality of other compute nodes over a network. A plurality of processes executing on the plurality of compute nodes generate a shared file. The compute node implements a Parallel Log Structured File System (PLFS) library to store at least one portion of the shared file and metadata for the at least one portion of the shared file on one or more of the plurality of object storage servers. The compute node is further configured to store the metadata by striping the metadata across a plurality of subdirectories of the shared file.

In one exemplary embodiment, the metadata is striped across the plurality of subdirectories in a round-robin manner. The plurality of subdirectories are stored on one or more of the object storage servers. Write and read processes optionally communicate using a message passing interface. A given write process writes metadata for a given portion of the shared file to an index file in a particular one of the subdirectories corresponding to the given portion.

Advantageously, illustrative embodiments of the invention write data from a group of distributed processes to a shared file using a parallel log-structured file system. Metadata processing operations in accordance with aspects of the present invention reduce data processing and transfer bandwidth costs and preserve valuable disk space. These and other features and advantages of the present invention will become more readily apparent from the accompanying drawings and the following detailed description.

BRIEF DESCRIPTION OF THE DRAWINGS

FIG. 4 illustrates an exemplary directory for storing the exemplary file foo of FIG. 2 in accordance with an alternate embodiment of the present invention;

FIGS. 5 through 11 illustrate exemplary pseudo code for implementing a number of processes incorporating aspects of the present invention.

DETAILED DESCRIPTION

Illustrative embodiments of the present invention will be described herein with reference to exemplary parallel file systems and associated clients, servers, storage arrays and other processing devices. It is to be appreciated, however, that the invention is not restricted to use with the particular illustrative parallel file system and device configurations shown. Accordingly, the term "parallel file system" as used herein is intended to be broadly construed, so as to encompass, for example, distributed file systems, cluster file systems, and other types of file systems implemented using one or more clusters of processing devices.

As indicated above, one challenge in a parallel file system when a plurality of distributed processes write to a shared file, is the amount of metadata that must be stored and processed. Aspects of the present invention recognize that the logging of data in a parallel file system improves data bandwidth but creates excessive metadata. According to one aspect of the present invention, metadata is striped to reduce the metadata lookup time as well as the metadata memory footprint. For example, big data and cloud environments are beginning the inevitable convergence with high performance computing (HPC) since cloud compute nodes are likely to be less powerful than typical HPC compute nodes. In one exemplary embodiment, the sharding of metadata in accordance with the present invention is integrated with flash-based HPC burst buffer nodes positioned on the edge of the cloud to reduce any performance cost associated with multiple metadata lookups that may become necessary if the striped metadata is cached only for a subset of the stripes.

While the present invention is illustrated in the context of a PLFS file system, the present invention can be employed in any parallel file system that employs extensive data mapping metadata.

Figure 1:
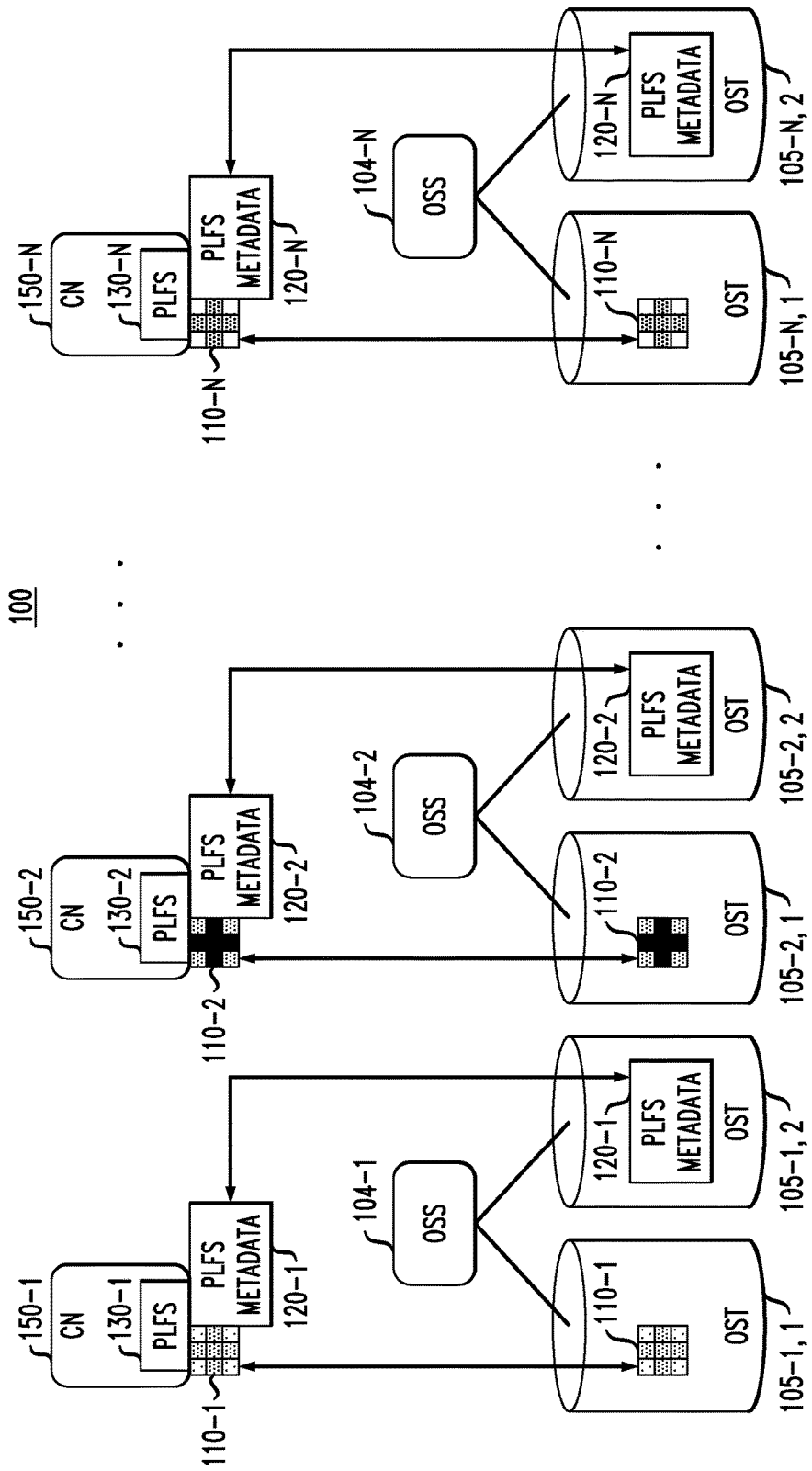
FIG. 1 is a block diagram of a conventional parallel file system in which a plurality of applications executing on a plurality of compute nodes generate a shared file.

FIG. 1 shows an exemplary conventional parallel file system 100. The exemplary parallel file system 100 comprises a plurality of compute nodes (CNs) 150 and a plurality of object storage servers (OSS) 104. More particularly, the parallel file system 100 comprises N compute nodes 150 denoted 150-1 through 150-N, and object storage servers denoted 104-1 through 104-N. Each of the object storage servers 104 has one or more corresponding storage devices 105 which may comprise a storage array or other type of storage device. Thus, the exemplary object storage servers 104-1 through 104-N have associated exemplary storage devices 105-1,1 and 105-1, 2 through 105-N, 1 and 105-N, 2, respectively. The compute nodes 150 and object storage servers 104 communicate with one another, for example, over a network (not shown). The storage devices 105 are also referred to herein as object storage targets of their corresponding object storage servers 104.

One or more of the devices in FIG. 1 comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also included in one or more of the devices in FIG. 1 is network interface circuitry. The network interface circuitry allows the devices to communicate over the network with compute nodes 150 and/or object storage servers 104. The network interface circuitry may comprise, for example, one or more conventional transceivers.

The parallel file system 100 may be embodied as a parallel log-structured file system (PLFS). The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

Storage arrays utilized in the parallel file system 100 may comprise, for example, storage products such as VNX and Symmetrix VMAX, both commercially available from EMC Corporation of Hopkinton, Mass. A variety of other storage products may be utilized to implement at least a portion of the object storage targets of the parallel file system 100.

The network may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 may optionally be arranged into a plurality of storage tiers, in a known manner. As noted above, each of the storage devices 105 may be viewed as being representative of an object storage target of the corresponding one of the object storage servers 104.

Also, although two object storage targets 105 are associated with each object storage server 104 in the FIG. 1 embodiment, other embodiments may associate a different number of object storage targets with each object storage server.

The parallel file system 100 may be implemented, by way of example, in the form of a Lustre file system, although use of Lustre is not a requirement of the present invention. Accordingly, servers 104 need not be configured with Lustre functionality, but may instead represent elements of another type of cluster file system.

In the parallel file system 100 of FIG. 1, a plurality of distributed applications on compute nodes 150 write data to a shared file. The object storage servers 104 and object storage targets 105 are optionally implemented as Lustre OSS and OST elements, respectively. Additional details regarding conventional aspects of an exemplary Lustre file system may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein. Additional details regarding the use of PLFS on compute nodes 150 may be found in, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

In the exemplary embodiment of FIG. 1, a given OSS 104 exposes two OSTs 105. Each of the OSTs may comprise one or more storage arrays or other types of storage devices. The total data storage capacity of the cluster file system 100 is the sum of all the individual data storage capacities represented by the OSTs 105. The compute nodes 150 can concurrently access this collective data storage capacity using data IO requests directed to the OSSs 104. The IO requests and other similar requests herein may be configured, for example, in accordance with standard portable operating system interface (POSIX) system calls.

As indicated above, PLFS is a virtual log-structured file system that allows data to be written quickly in such parallel file systems 100. PLFS is particularly useful when multiple applications on compute nodes 150 write concurrently to a shared file. One challenge, however, as noted above, is that the amount of metadata required to be read data back from PLFS can be extremely large.

When an application on a compute node 150 writes to a shared file, a PLFS library 130 on the compute node 150 translates the write operation into a write to a given sub-file or data portion 110. The PLFS library 130 interacts with the exemplary Lustre file system and applications running on the compute nodes 150.

As shown in FIG. 1, a plurality of distributed applications on compute nodes 150 write data to a shared file. The PLFS library 130 on each compute node 150 reorganizes the data into multiple sub-file portions 110-1 through 110-N. Thus, the data can be distributed among multiple OSSs 105 and the applications on the compute nodes 150 thereby achieve better utilization of the storage system.

The PLFS library 130 also creates metadata 120-1 through 120-N associated with each corresponding data portion 110-1 through 110-N that must be stored along with the corresponding data portion 110-1 through 110-N. Metadata is created for each data portion (sub-file) 110 to indicate where the data is stored. The metadata 120 comprises, for example, a logical offset, a physical offset, a length, a file (datalog) identifier, as well as timestamps for start and end times. The metadata is resolved when the shared file is read. One challenge, however, is that the amount of metadata required to be read data back can be extremely large. Each reading process must read all of the metadata that was created by all of the writing processes. Thus, the PLFS library 130 on each compute node 150 must keep an image of the entire metadata 120 corresponding to all data portions 110-1 through 110-N of a given shared file. The metadata 120-1 through 120-N is also stored by the OSSs 104 on the OSTs 105.

In addition, if multiple write processes on different compute nodes 150 write overlapping regions 110 in a shared file, then the PLFS metadata 120 contains stale entries that are still unnecessarily obtained when the read index is constructed.

These and other drawbacks of conventional arrangements are addressed by aspects of the present invention by striping the PLFS metadata across a plurality of subdirectories. Aspects of the present invention recognize that one benefit of PLFS is the logging of data for a non-deterministic placement of data, but at the expense of the significant logged metadata. Meanwhile, other types of file systems advantageously stripe stored data across storage nodes (typically in a round-robin manner, for a deterministic placement of data) and have significantly less metadata. Thus, aspects of the present invention provide a hybrid solution, whereby data is logged in PLFS and the metadata is striped. Generally, a comparable amount of metadata is required as the conventional approach, but only one stripe of metadata corresponding to the desired data needs to be accessed on a read of the corresponding data. In this manner, the PLFS metadata 120 is striped and then the necessary portions of metadata are read, as needed.

As will be described, such arrangements advantageously allow for more efficient storage of metadata for a shared file in a parallel file system without significant changes to object storage servers, or applications running on those devices.

Figure 2:
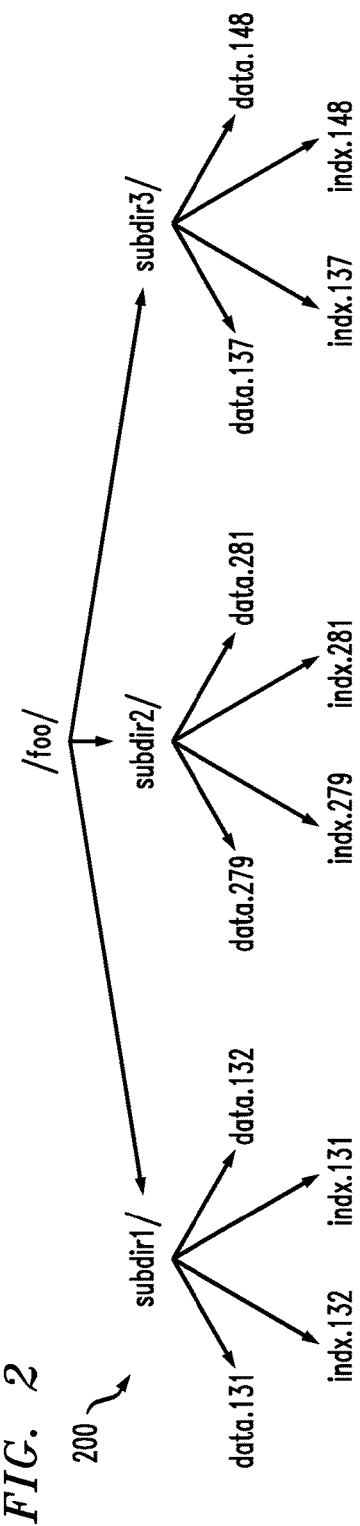
FIG. 2 illustrates an exemplary conventional directory for storing an exemplary file foo in the parallel file system of FIG. 1.

FIG. 2 illustrates an exemplary directory 200 for storing an exemplary file foo in the parallel file system 100 of FIG. 1 using the conventional approach described above. As shown in FIGS. 1 and 2, PLFS stores data and corresponding metadata and data into directories and files on one or more object storage targets 105. Typically, each write process writes one data log (data) and one corresponding index log (metadata) into a container subdirectory (e.g., subdir1) by performing a hash operation on the writer identifier to select a random subdirectory. For example, as shown in FIG. 2, write processes 131 and 132 write data and corresponding metadata into a container subdirectory subdir1, while write processes 279 and 281 write data and corresponding metadata into a container subdirectory subdir2.

On a read operation, all of the index logs (indx) must be read to build a global index across the entire file (foo in FIG. 2) since any data might be written in any data log and there is a correspondence between the index logs and the data logs.

Figure 3:
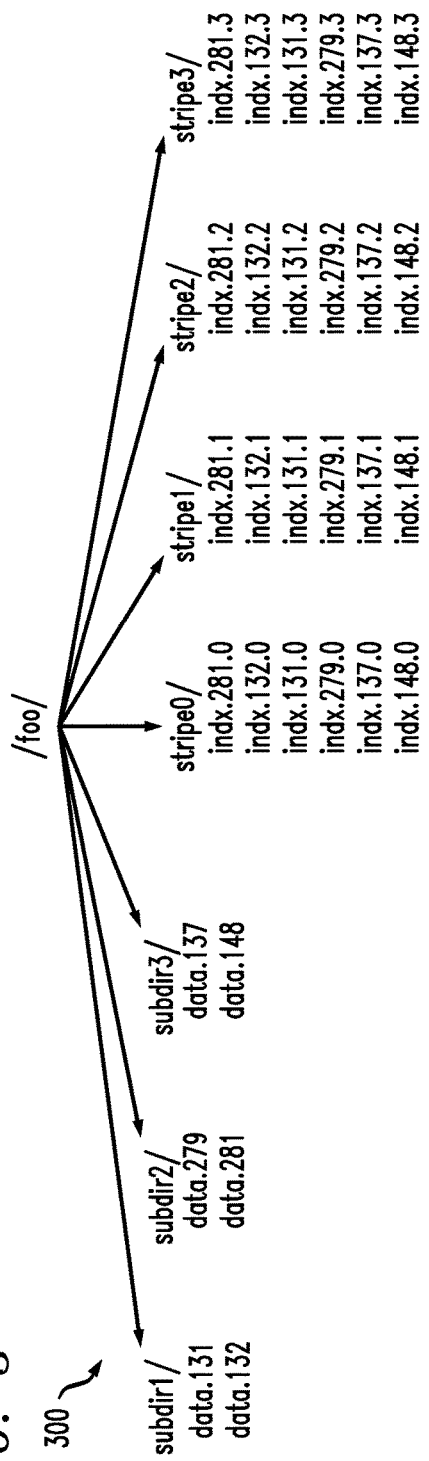
FIG. 3 illustrates an exemplary directory for storing the exemplary file foo of FIG. 2 in accordance with aspects of the present invention.

FIG. 3 illustrates an exemplary directory 300 for storing the exemplary file foo of FIG. 2 in accordance with aspects of the present invention. The containers in the exemplary directory 300 may be stored on one or more object storage targets 105, as would be apparent to a person of ordinary skill in the art. As shown in FIG. 3, each write process will write data to one or more corresponding subdirectories and multiple index logs by directing them to a subdirectory corresponding to each stripe. For example, as shown in FIG. 3, write processes 131 and 132 write logged data into a container subdirectory subdir1 and corresponding metadata is striped across a plurality of metadata stripe subdirectories stripe0 through stripe 3 in a round-robin manner, while write processes 279 and 281 write data into a container subdirectory subdir2 and corresponding metadata is striped across a plurality of metadata stripe subdirectories stripe0 through stripe 3. For example, the metadata for each subsequent gigabyte for the file foo is striped in a round-robin manner across the plurality of metadata stripe subdirectories stripe0 through stripe 3. For example, the metadata for the first gigabyte of each file may be stored in subdirectory stripe0 and the metadata for the second gigabyte of each file may be stored in subdirectory stripe1 and so forth. Thus, all metadata for stripe0, for example, is stored in subdirectory stripe0. Each write process (e.g., write process 279) has an index file in each stripe subdirectory for storing metadata for that write process for that stripe of data.

On a read operation, only the index logs for the target stripe are obtained. For example, if the second gigabyte of a file is desired, only the metadata in stripe1 needs to be accessed. The index files in the exemplary directory 300 can be cached and evicted as needed, to reduce the minimum amount of PLFS metadata needed to be consulted from the entire file to that for only a single stripe.

The total number of index log files in the exemplary directory 300 is larger than the total number of index log files in the directory 200 of FIG. 2, since each write process that used to write only a single index log now will write one for each stripe to which it writes.

In this manner, shared writes are decoupled, with a similar data distribution as the conventional solution of FIG. 1, without the additional overhead created by storing an image of all of the PLFS metadata on each compute node 150. Thus, among other benefits, aspects of the present invention allow a plurality of distributed applications to write to a shared file without having the PLFS metadata compete for storage resources on the compute nodes 150. In this manner, only a portion of the PLFS metadata is stored on each compute node 150.

Figures 4, 5:
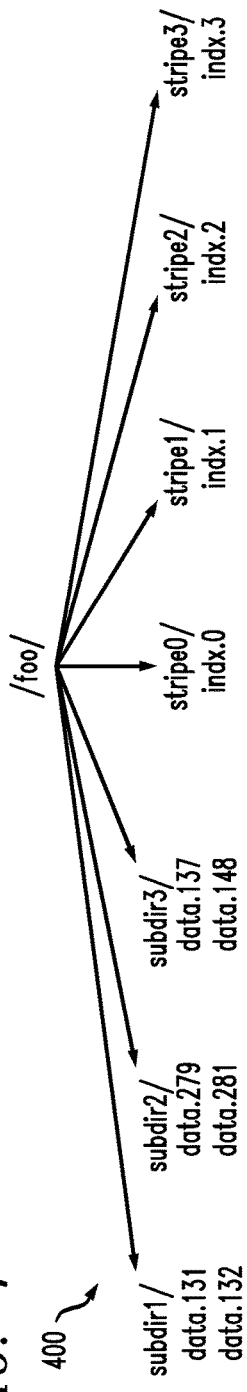

FIG. 4 illustrates an exemplary directory 400 for storing the exemplary file foo of FIG. 2 in accordance with an alternate embodiment of the present invention. The containers in the exemplary directory 400 may be stored on one or more object storage targets 105, as would be apparent to a person of ordinary skill in the art. As shown in FIG. 4, each write process will write data to one or more corresponding subdirectories and multiple index logs by directing them to a subdirectory corresponding to each stripe. In the embodiment of FIG. 4, however, one particular write process is responsible for writing to the index entries of a given stripe. While the embodiment of FIG. 3 has a separate index file for each write process and each stripe, the embodiment of FIG. 4 has a single index file for each stripe.

In the exemplary embodiment of FIG. 4, low-latency Message Passing Interface (MPI) communications are employed to bind the multiple write processes together so that one MPI rank process can be designated with responsibility for writing metadata to a particular stripe subdirectory. As discussed further below in conjunction with FIG. 9, when a collective MPI_File_open call is made, the PLFS MPI-IO layer can determine the striping parameters and distribute the responsibility for the stripes across the MPI rank processes participating in the call. Each rank process hosting a particular stripe may need to spawn a listening thread in case subsequent write operations are not collective. Each write operation will then send the metadata to the MPI rank process hosting the corresponding stripe. Write operations that span stripes will need to split the metadata and send multiple metadata pieces to each stripe across which the data spans.

Among other benefits, the use of MPI communications in the manner described above results in only one index file per stripe. In addition, the MPI rank process can optionally buffer the metadata to collapse and remove any stale metadata. This also means that the index "log" will actually be a contiguous "flattened" set of index entries that will speed the ingest. Each MPI rank hosting a stripe will create the stripe subdirectory and can read any existing stripe metadata if this isn't a newly created file. Further, the same distribution of stripes to ranks can be done on a read and each rank can load the index for that stripe and serve lookups from other ranks with a spawned listener thread. Since the index metadata will be distributed across ranks, the index metadata should not ever need to be evicted and then re-constructed.

FIG. 5 illustrates exemplary pseudo code 500 for a PLFS open write operation using POSIX. As shown in FIG. 5, the exemplary pseudo code 500 initially performs conventional PLFS operations such as creating the top level container. Thereafter, the exemplary pseudo code 500 creates the sub-directories for storing the striped metadata.

FIG. 6 illustrates exemplary pseudo code 600 for a PLFS write operation using POSIX, to illustrate how the stripe index is written. As shown in FIG. 6, if the write spans multiple stripes, then the write is optionally split into multiple write operations that do not span stripes and then recursively call this function for each write operation. Then, one write operation is performed to a different index log for each write operation and one write for each write operation to the same data log. Then, it can be assumed that a write operation does not span a stripe. Rather than a single index log per file, as shown in FIG. 2, the exemplary pseudo code 600 creates an index log for each stripe.

FIG. 7 illustrates exemplary pseudo code 700 for a PLFS open read operation using POSIX. As shown in FIG. 7, the exemplary pseudo code 700 initially performs conventional PLFS operations such as ensuring that the indicated file exists, with the appropriate permissions. Thereafter, the exemplary pseudo code 700 initializes and reads in the data logs that contain the PLFS metadata 120.

FIG. 8 illustrates exemplary pseudo code 800 for a PLFS read operation using POSIX. As shown in FIG. 8, the exemplary pseudo code 800 operates in a similar manner as a conventional PLFS read operation. If the read operation spans multiple stripes, then the read operation is split into multiple read operations that do not span multiple stripes. Generally, the exemplary pseudo code 800 fetches, caches, and returns the index (metadata) for a given stripe.

An existing implementation for a PLFS read operation is discussed, for example, at https://github com/plfs/plfs-core/blob/2.4/src/LogicalFS/PLFSIndex.cpp, incorporated by reference herein.

FIG. 9 illustrates exemplary pseudo code 900 for exemplary MPI_File_open/close operations. FIG. 9 illustrates how the listener thread is spawned and the stripe directory is created and the stripe index is read. The listener thread is called an index server. Note that every rank in the MPI job is an index client and an index server. FIG. 9 also illustrates how the buffered stripe index logs are flushed on a close operation.

FIG. 10 illustrates exemplary pseudo code 1000 for an exemplary MPI_File_write operation. FIG. 10 illustrates how the metadata is split if it spans multiple stripes and then is sent to the listener threads.

FIG. 11 illustrates exemplary pseudo code 1100 for an exemplary MPI_File_read operation. The exemplary pseudo code 1100 (FIG. 11) is similar to the exemplary pseudo code 800 (FIG. 8) for a POSIX read operation (splitting the read operation if it spans multiple stripes). In one variation, the index is striped for read operations as well, using the same listener thread approach.

It is noted that there need not be separate plfs_write_open and plfs_read_open calls, as discussed herein for illustrative purposes. Among other benefits, aspects of the present invention enable the convergence of big data and HPC by sharding metadata and logging data in large parallel storage systems.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It is to be appreciated that the particular operations and associated messaging illustrated in FIGS. 2 through 11 are exemplary only, and numerous other types of operations and messaging may be used in other embodiments. It should therefore be understood that in other embodiments different arrangements of additional or alternative elements may be used. At least a subset of these elements may be collectively implemented on a common processing platform, or each such element may be implemented on a separate processing platform.

As indicated previously, components of a compute node 150 having exemplary PLFS software as disclosed herein can be implemented at least in part in the form of one or more software programs stored in memory and executed by a processor of a processing device. A memory having such program code embodied therein is an example of what is more generally referred to herein as a "computer program product."

Figure 12:
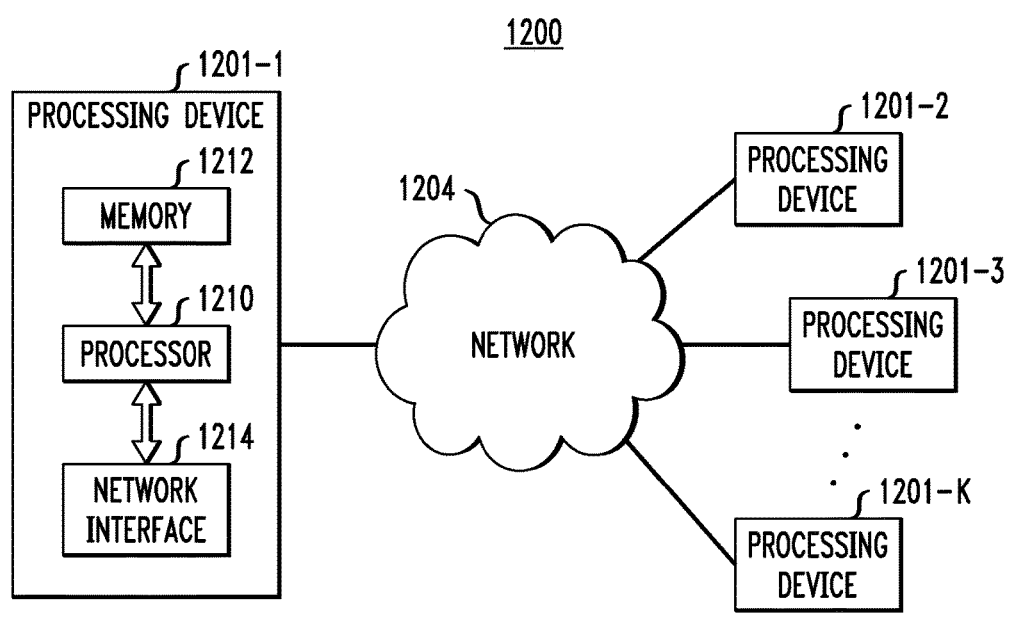
FIG. 12 illustrates an exemplary processing platform in which aspects of the present invention can be employed.

FIG. 12 illustrates an exemplary processing platform in which aspects of the present invention can be employed. The exemplary processing platform 1200 comprises a plurality of processing devices, denoted 1202-1, 1202-2, 1202-3, . . . 1202-K, that communicate with one another over a network 1204. The network 1204 may comprise any type of network, such as a WAN, a LAN, a satellite network, a telephone or cable network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA) or other type of processing circuitry, as well as portions or combinations of such circuitry elements, and the memory 1212, which may be viewed as an example of a "computer program product" having executable computer program code embodied therein, may comprise random access memory (RAM), read-only memory (ROM) or other types of memory, in any combination.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in FIG. 12 is presented by way of example only, and system 100 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIG. 1 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a compute node connected to a parallel file system;
the compute node being configured to communicate with a plurality of object storage servers and with a plurality of other compute nodes over a network, wherein a plurality of processes executing on said plurality of compute nodes generate a shared file;
the compute node further configured to implement a Parallel Log Structured File System (PLFS) library to store at least one portion of said shared file and metadata for said at least one portion of said shared file on one or more of said plurality of object storage servers; and
the compute node further configured to store said metadata by striping said metadata in a plurality of stripes across a plurality of subdirectories of said shared file, wherein metadata for a given stripe of data of said shared file generated by said plurality of processes is stored in a particular metadata stripe such that only one metadata stripe is accessed on a read operation of the given stripe of data to obtain said metadata corresponding to the given stripe of data, wherein each of said plurality of processes that generate said shared file have a corresponding index file in said metadata stripe to write said metadata for said given stripe of data of said shared file.

2. The apparatus of claim 1, wherein said metadata for said shared file is striped across said plurality of subdirectories in a round-robin manner.

3. The apparatus of claim 1, wherein said plurality of subdirectories are stored on one or more of said object storage servers.

4. The apparatus of claim 1, wherein one or more of write and read processes communicate using a message passing interface.

5. The apparatus of claim 1, wherein said PLFS library provides one or more function calls for writing and reading said metadata.

6. A method comprising:
configuring a compute node of connected to a parallel file system to communicate with a plurality of object storage servers and with a plurality of other compute nodes over a network, wherein a plurality of processes executing on said plurality of compute nodes generate a shared file; and
configuring the compute node to implement a Parallel Log Structured File System (PLFS) library to store at least one portion of said shared file and metadata for said at least one portion of said shared file on one or more of said plurality of object storage servers; and
configuring the compute node to store said metadata by striping said metadata in a plurality of stripes across a plurality of subdirectories of said shared file, wherein wherein metadata for a given stripe of data of said shared file generated by said plurality of processes is stored in a particular metadata stripe such that only one metadata stripe is accessed on a read operation of the given stripe of data to obtain said metadata corresponding to the given stripe of data, wherein each of said plurality of processes that generate said shared file have a corresponding index file in said metadata stripe to write said metadata for said given stripe of data of said shared file;
the compute node being implemented utilizing at least one processing device coupled to a memory.

7. The method of claim 6, wherein said metadata for said shared file is striped across said plurality of subdirectories in a round-robin manner.

8. The method of claim 6, wherein said plurality of subdirectories are stored on one or more of said object storage servers.

9. The method of claim 6, wherein one or more of write and read processes communicate using a message passing interface.

10. The method of claim 6, wherein said PLFS library provides one or more function calls for writing and reading said metadata.

11. A parallel file system comprising:
a plurality of compute nodes; and
a plurality of object storage servers;
one of the plurality of compute nodes being configured to communicate with said plurality of object storage servers and with others of said plurality of compute nodes over a network, wherein a plurality of processes executing on said plurality of compute nodes generate a shared file;
the one compute node further configured to implement a Parallel Log Structured File System (PLFS) library to store at least one portion of said shared file and metadata for said at least one portion of said shared file on one or more of said plurality of object storage servers;
the compute node further configured to store said metadata by striping said metadata in a plurality of stripes across a plurality of subdirectories of said shared file, wherein metadata for a given stripe of data of said shared file generated by said plurality of processes is stored in a particular metadata stripe such that only one metadata stripe is accessed on a read operation of the given stripe of data to obtain said metadata corresponding to the given stripe of data, wherein each of said plurality of processes that generate said shared file have a corresponding index file in said metadata stripe to write said metadata for said given stripe of data of said shared file.

12. The parallel file system of claim 11, wherein said metadata for said shared file is striped across said plurality of subdirectories in a round-robin manner.

13. The parallel file system of claim 11, wherein said plurality of subdirectories are stored on one or more of said object storage servers.

14. The parallel file system of claim 11, wherein one or more of write and read processes communicate using a message passing interface.

15. The parallel file system of claim 11, wherein said PLFS library provides one or more function calls for writing and reading said metadata.

16. The apparatus of claim 4, wherein one message passing interface rank process is designated to write metadata to a particular stripe subdirectory.

17. The apparatus of claim 16, wherein said one message passing interface rank process spawns a listening thread to process subsequent write operations.

18. The method of claim 9, wherein one message passing interface rank process is designated to write metadata to a particular stripe subdirectory.

19. The method of claim 18, wherein said one message passing interface rank process spawns a listening thread to process subsequent write operations.

20. The parallel file system of claim 14, wherein one message passing interface rank process is designated to write metadata to a particular stripe subdirectory.

\* \* \* \* \*